United States Patent
Merrigan et al.

(10) Patent No.: US 8,914,380 B2
(45) Date of Patent: *Dec. 16, 2014

(54) SEARCH INDEX FORMAT OPTIMIZATIONS

(75) Inventors: Chadd Creighton Merrigan, Redmond, WA (US); Mihai Petriuc, Redmond, WA (US); Raif Khassanov, Sammamish, WA (US); Artsiom Ivanovich Kokhan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 332 days.

This patent is subject to a terminal disclaimer.

(21) Appl. No.: 13/424,137

(22) Filed: Mar. 19, 2012

(65) Prior Publication Data

US 2012/0179668 A1 Jul. 12, 2012

Related U.S. Application Data (63) Continuation of application No. 12/139,213, filed on Jun. 13, 2008, now Pat. No. 8,166,041.

(51) Int. Cl.
*G06F 17/30* (2006.01)
(52) U.S. Cl.
CPC ............................... *G06F 17/30619* (2013.01)
USPC .......................................... 707/742; 707/708
(58) Field of Classification Search
CPC ................................................ G06F 17/30619
USPC .................................................. 707/742, 708
See application file for complete search history.

(56) References Cited

U.S. PATENT DOCUMENTS

| | | | |
|---|---|---|---|
| 5,319,779 A | 6/1994 | Chang et al. | |
| 5,649,183 A | 7/1997 | Berkowitz et al. | |
| 5,737,733 A * | 4/1998 | Eller | 707/708 |
| 5,848,409 A | 12/1998 | Ahn | |

(Continued)

FOREIGN PATENT DOCUMENTS

| | | |
|---|---|---|
| CN | 101110077 A | 1/2008 |
| EP | 1160683 A2 | 12/2001 |

(Continued)

OTHER PUBLICATIONS

U.S. Appl. No. 12/139,213, Office Action mailed May 11, 2011, 11 pages.

(Continued)

*Primary Examiner* — Apu Mofiz
*Assistant Examiner* — Chelcie Daye
(74) *Attorney, Agent, or Firm* — Tom Wong; Jim Ross; Micky Minhas (57) ABSTRACT

A search index structure which extends a typical composite index by incorporating an index which is optimized for fast retrieval from storage and which eliminates data which is specific to phrase searching. Other data is represented in a manner which allows it to be calculated rather than stored. Associating variable length entries with logical categories allows their length to be inferred from the category rather than stored. Using delta values between document IDs rather than the ID itself generates a compact, dense symbol set which is efficiently compressed by Huffman encoding or a similar compression method. Using an upper threshold to remove large, and thus rare, delta values from the symbol set prior to encoding further improves the encoding performance.

20 Claims, 8 Drawing Sheets

(56) References Cited

U.S. PATENT DOCUMENTS

| | | | |
|---|---|---|---|
| 5,987,459 A | | 11/1999 | Swanson et al. |
| 6,055,526 A | | 4/2000 | Ambroziak |
| 6,134,541 A | | 10/2000 | Castelli et al. |
| 6,298,344 B1 | | 10/2001 | Inaba et al. |
| 6,321,227 B1 | | 11/2001 | Ryu |
| 6,353,825 B1 | * | 3/2002 | Ponte ............................ 707/5 |
| 6,636,849 B1 | | 10/2003 | Tang et al. |
| 6,801,904 B2 | * | 10/2004 | Chaudhuri et al. ............ 707/2 |
| 7,007,005 B2 | | 2/2006 | Rautenback et al. |
| 7,028,045 B2 | | 4/2006 | Franz et al. |
| 7,243,110 B2 | | 7/2007 | Grondin et al. |
| 7,756,877 B2 | * | 7/2010 | Loofbourrow ............. 707/741 |
| 7,853,598 B2 | * | 12/2010 | Transier et al. ........... 707/742 |
| 8,166,041 B2 | | 4/2012 | Merrigan et al. |
| 2008/0133565 A1 | * | 6/2008 | Yasuda et al. ............. 707/101 |
| 2008/0162432 A1 | * | 7/2008 | Wang ........................... 707/3 |

FOREIGN PATENT DOCUMENTS

| | | |
|---|---|---|
| JP | HEI 02-158870 | 6/1990 |
| JP | HEI 08-287105 | 11/1996 |
| JP | 2000-101847 | 4/2000 |
| JP | 2000-298668 | 10/2000 |
| JP | 2005-129071 | 5/2005 |
| RU | 2266560 C1 | 12/2005 |
| RU | 2297665 C2 | 4/2007 |

OTHER PUBLICATIONS

U.S. Appl. No. 12/139,213, Response filed Sep. 9, 2011, 9 pages.

U.S. Appl. No. 12/139,213, Notice of Allowance mailed Dec. 19, 2011, 12 pages.

PCT International Search Report in Application PCT/US2009/043816, mailed Dec. 30, 2009, 9 pages.

PCT International Preliminary Report on Patentability in Application PCT/US2009/043816, mailed Dec. 13, 2010, 4 pages.

Chinese First Office Action in Application 200980122470.2 mailed Jul. 9, 2012, 9 pages.

European Search Report in Application 09763152.7 mailed Oct. 1, 2012, 9 pages.

Zhang et al., "Performance of Compressed Inverted List Caching in Search Engines", Proceeding of the 17th International Conference on World Wide Web, Apr. 21-25, 2008, WWW 2008, pp. 387-396, New York, NY.

Ziviani et al., "Compression: A Key for Next-Generation Text Retrieval Systems", Computer, Nov. 2000, pp. 37-44, vol. 33, No. 11, IEEE Service Center, Los Alamitos, CA.

Persin et al., "Fast Document Ranking for Large Scale Information Retrieval", Proceedings of the First International Conference on Applications of Databases, Jun. 21-23, 1994, pp. 253-266.

Lu et at, "Panaché: A Scalable Distributed Index for Keyword Search", obtained online at: http://pdos.csail.mit.edu/6.824-2002/projects/panache.pdf, pp. 1-10.

Zhang et al., "Optimized Inverted List Assignment in Distributed Search Engine Architectures," CIS Department, Polytechnic University, Brooklyn, NY, 2007 IEEE, obtained online at: http://cis.poly.edu/~zjg/colloc.pdf, pp. 1-10.

Zhong et al., "An Evaluation and Comparison of Current Peer-to-Peer Full-Text Keyword Search Techniques", Eighth International Workshop on the Web and Databases (WebDB 2005), Jun. 16-17, 2005, Baltimore, MD, obtained online at: http://webdb2005.uhasselt.be/papers/4-1.pdf, 6 pages.

Chaudhuri et al., "Heavy-Tailed Distributions and Multi-Keyword Queries", SIGOR '07, Jul. 23-27, 2007, Amsterdam, The Netherlands, obtained online at: http://research.microsoft.com~chrisko/papers/sigir07.pdf, 8 pages.

Japanese Notice of Rejection in Application 2011-513530, mailed Jun. 18, 2013, 6 pgs.

European Office Action in Application 09763152.7, mailed Oct. 18, 2012, 1 page.

Chinese Notice of Allowance in Application 200980122470.2, mailed Jan. 29, 2013, 4 pgs.

Australian Office Action in Application 2009257851, mailed Mar. 13, 2014, 4 pgs.

Japanese Notice of Allowance in Application 2011-513530, Oct. 15, 2013, 5pgs.

Russian Notice of Allowance in Application 2010150819, mailed Jul. 11, 2013, 20 pgs.

Australian Notice of Acceptance in Application 2009257851, mailed Jun. 20, 2014, 2 pgs.

Taiwanese Search Report in Application 098116039, mailed Jul. 18, 2014, 1 page.

* cited by examiner

SEARCH INDEX FORMAT OPTIMIZATIONS

CROSS-REFERENCE TO RELATED APPLICATIONS

This application is a continuation application of U.S. patent application Ser. No. 12/139,213 (now U.S. Pat. No. 8,166,041), entitled "SEARCH INDEX FORMAT OPTIMIZATIONS," filed on Jun. 13, 2008, the complete disclosure of which is hereby incorporated by reference in its entirety.

BACKGROUND

Searching for keywords or similar data items within a search domain made up of a number of documents typically involves the use of an index. Often, this is an inverted index which associates keywords with documents.

Where the search index is general purpose in nature, it must support a variety of types of searches. One common example is a keyword search where the user supplies one or more keywords, or values, and the search result is all documents within the search domain which contain all of the keywords. Another example is a phrase search where the user supplies a phrase made up of two or more words in a specified order. The search result in this case is all documents from the search domain which contain the phrase exactly as supplied (i.e., all words adjacent and in the same order). An index which supports phrase queries must contain significantly more data than one which does not because it must include the position within the document of every occurrence of the word.

In order to meet the user's needs, searching must be both fast and accurate. At the index level this levies competing requirements. The index must be complete in order to be accurate, but this drives a need for a larger index. The index must be small in order to be accessed quickly, but this drives a need to eliminate data. Compression schemes can be used to reduce the amount of data which must be read in, but this may not be sufficient to meet the user's need for quick results.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

Various aspects of the subject matter disclosed herein are related to a search index structure in which an extension to the pre-existing structure is used to optimize non-phrase searches. This optimization includes the elimination of information about the location of keyword occurrences within the document.

Other aspects relate to the elimination of data by structuring the index in such a way that it can be calculated rather than stored. Associating variable length occurrence count fields with logical categories allows the size of the field to be inferred from the category rather than stored. Using continuous symbols values within, and across categories allows the symbol vales to be calculated rather than stored in the category. Ordering the symbol entries within the categories, and matching that ordering in the encoding table allows the symbol which corresponds to a code to be calculated rather than stored.

The approach described below may be implemented as a computer process, a computing system or as an article of manufacture such as a computer program product. The computer program product may be computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the above summary can be obtained by reference to the accompanying drawings, which are briefly summarized below, to the following detailed description of present embodiments, and to the appended claims.

DETAILED DESCRIPTION

This detailed description is made with reference to the accompanying drawings, which form a part hereof, and which show, by way of illustration, specific embodiments. These embodiments are described in sufficient detail to enable those skilled in the art to practice what is taught below, and it is to be understood that other embodiments may be utilized and that logical, mechanical, electrical, and other changes may be made without departing from the spirit or scope of the subject matter. The following detailed description is, therefore, not to be taken in a limiting sense, and its scope is defined only by the appended claims.

Overview

The present disclosure addresses searching a set of documents (or files) within a search domain to find those most relevant to the user. Searching typically involves obtaining a set of keywords from the user to direct the search and then identifying all documents within the search domain which match those keywords. In attempting to identify these candidate documents, the search engine may look for the keywords within the body of the document or within specific sections, or properties, of the document (e.g., title, abstract, etc).

The resulting set of candidate documents contains all documents from the search domain which may be relevant. A ranking algorithm may then be applied to the candidate documents to predict the relevance of the documents to the user. The candidate documents are then typically presented to the user in decreasing order of predicted relevance.

Figure 1:
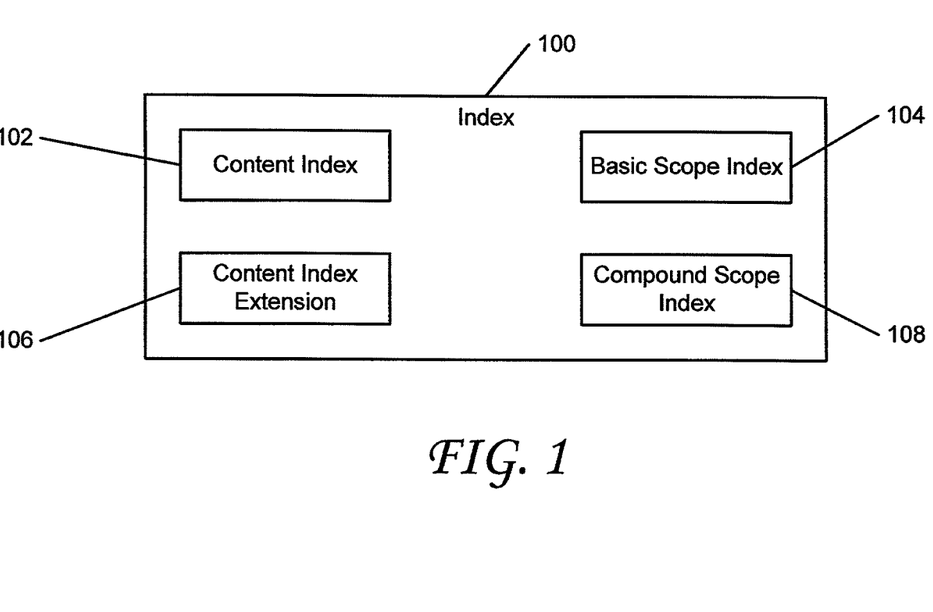
FIG. 1 illustrates an embodiment of a structure of a composite search index.

Embodiments of this type of searching typically utilize an inverted index structure which associates keywords with documents. Referring to FIG. 1 it can be seen that such an index 100 may consist of several components. Of primary interest to the present disclosure are the content index 102 and content index extension 106. While important to the overall searching process, the basic scope index 104 and compound scope index 108 are not directly relevant to the present disclosure.

The content index 102 is a complete index of the keywords found in documents in the search domain. It is structured to support a variety of types of searches and can be used independently of the content index extension 106. A flag within the content index 102 indicates whether there is information available for use in the content index extension 106. This flag is present for each keyword, providing control over how and when the extended information is used.

One type of search which the content index 102 supports is a "phrase" query. This is a query where the user is looking for a specific combination of words appearing in a specific order. A simple example is a search for the phrase "the quick brown fox." A document is a candidate if it contains that exact phrase, but not if it contains all of the words, scattered throughout the document or in a different order. For efficiency, this type of query requires that the index contain information about where each keyword appears within the document so that the search engine can determine whether they are adjacent and in the proper order. This information increases the size of the index and thus the amount of data which must be read in from the storage medium (e.g., disk drive) containing the index. For large search domains in which one or more of the supplied keywords appears in a high percentage of the documents, the time required to read in this data comprises a significant portion of the time required to perform the search.

The content index extension 106 is optimized for non-phrase queries involving keywords which appear in large number of documents. One use is for situations where the user supplies a set of keywords, all of which must appear in each candidate document, but not necessarily in any particular order. Another use is as an initial filter for a phrase query, weeding out those documents which do not contain all of the words prior to using the content index 102 to perform the more costly determination of whether the specific phrase is contained within the remaining documents.

Because the content index extension 106 does not need to support phrase queries, it does not need to contain information about the specific location(s) at which each keyword appears within each document (referred to as occurrence data). At most, it will store a count of how many times the word occurs, an Occurrence Count. This single value is far smaller than the set of numbers needed to represent each location within a document, especially where the word is widely used in the document. The elimination of this data reduces the amount of data which must be read from storage for each keyword. This decreases the time required to process each keyword, speeding up the search.

For the simplicity and clarity in the present disclosure the index will be described as consisting of separate files for each of the components. Clearly, the use of files is only one embodiment and is not intended as a limitation of the disclosure. The index is also described in terms of "keywords" which exist within "documents." The keyword is not restricted to be a "word." It could be a phrase, number, code, or any similar value to be searched for within the documents. In a similar manner, the term "document" will be used to refer to those entities which are being searched and which contain the keywords. They may be documents, files, cards, or any other logical structure having the requisite characteristics.

To further reduce the amount of data which needs to be read from storage, portions of the content index extension 106 are compressed as described below. One embodiment utilizes Huffman encoding which is a lossless entropy encoding scheme having the characteristic of using shorter codes for the more frequently occurring data items. Where the coding is applied to the differences (or step sizes) between document IDs, the compression becomes more efficient as the frequency of occurrence of the keyword within the search domain increases. This is a good match to the disclosed approach where the content index extension is only used for commonly used keywords.

Figure 2:
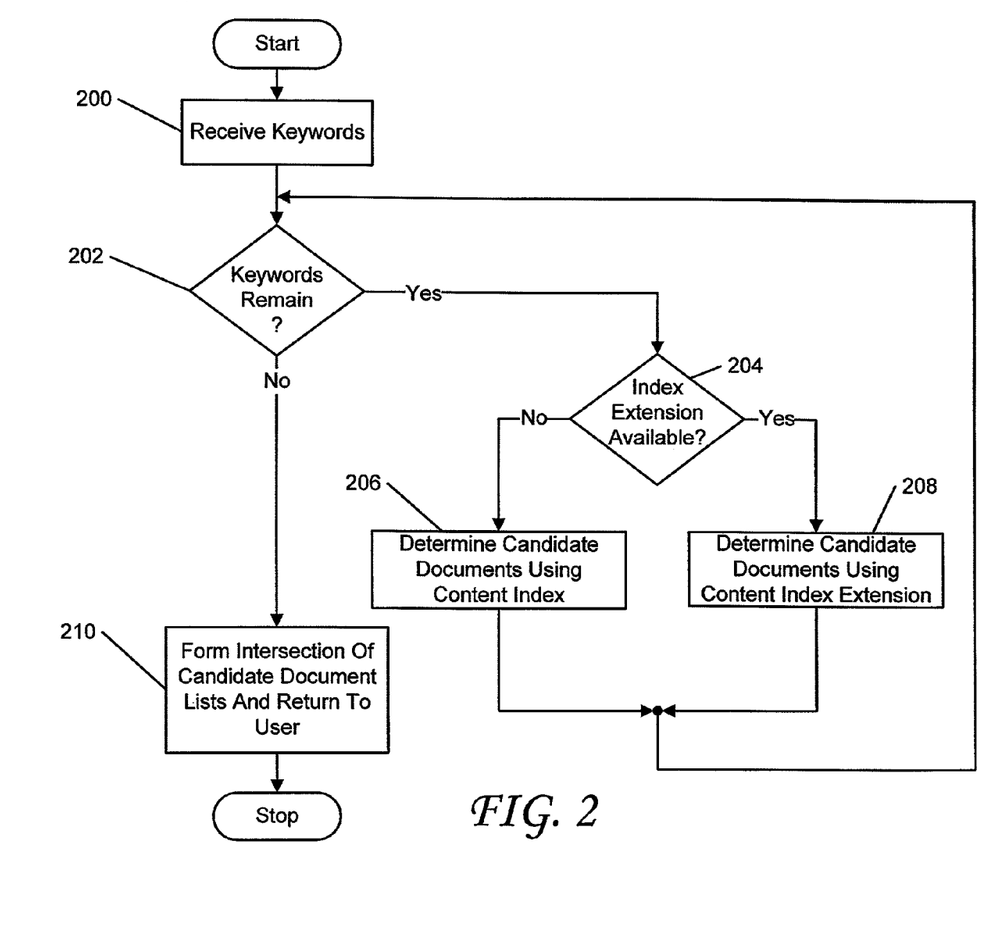
FIG. 2 shows the high level logical flow of an embodiment of a method to perform a multiword, non-phrase, query.

The content index extension 106 can be used in many ways in support of keyword searching. One use is illustrated in FIG. 2 which shows the high level logical flow of a multiword, non-phrase, query. The keywords are obtained from the user at step 200. Loop decision 202 controls the processing of each keyword. Within this loop, each keyword at step 204 is separately looked up in the content index 102 to determine if a content index extension ("CIX") is available for the keyword. This can be done without reading in the large amount of occurrence data because the requisite data can be stored within the header information for the keyword. If the flag is set within the content index 102 it will be accompanied by an offset into the content index extension 106 where the word is located. This allows the relevant information to be accessed directly. The indexing information from the content index extension 106 is then used to determine the list of documents which contain the current word at step 208. If there is not a content index extension 106 entry available, the list of candidate documents will be generated using the occurrence data in the content index 102 at step 206. After the list of candidate documents is obtained for each keyword individually, the intersection of these lists will be formed 210 generating a single list of all documents in which all of the keywords appear. This is the search result which will be made available to the user.

Figure 3:
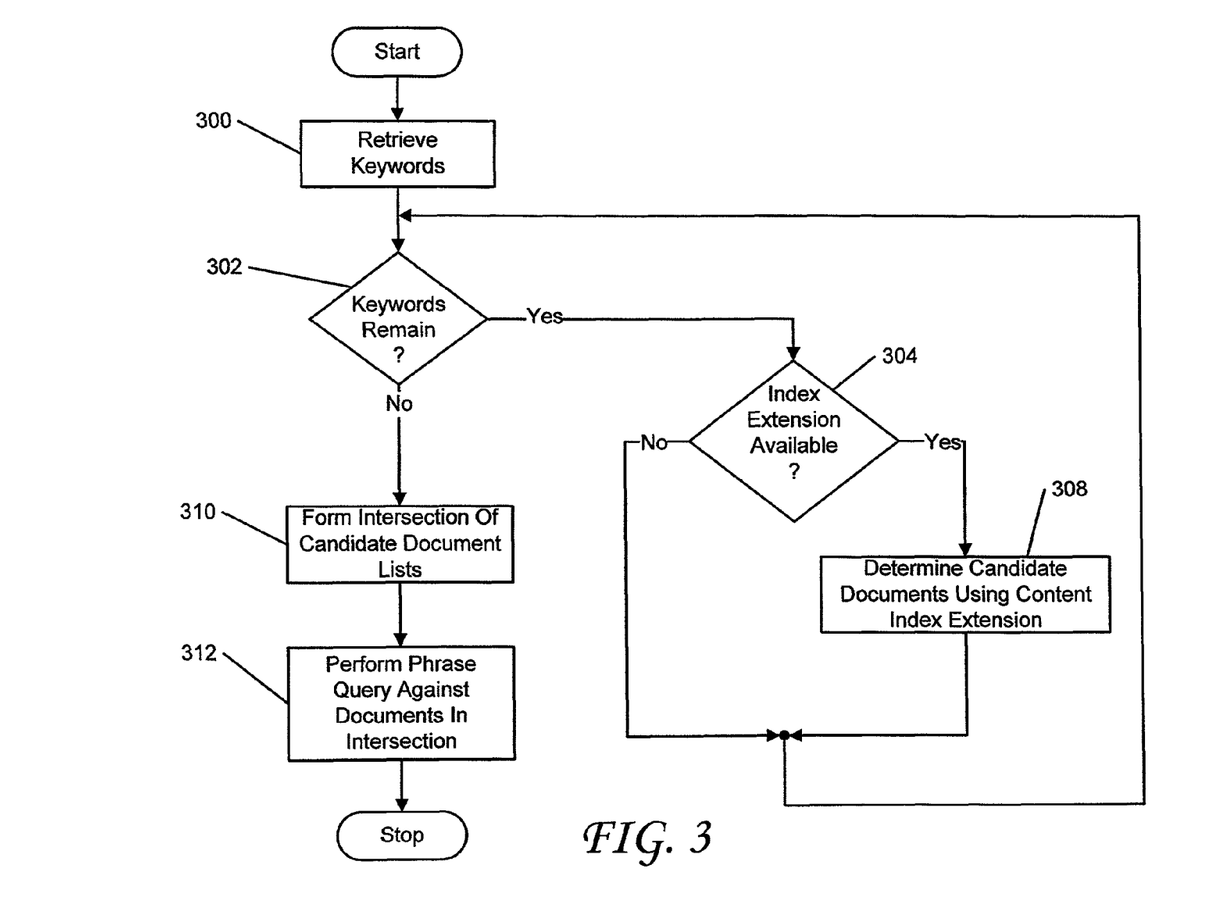
FIG. 3 shows the high level logical flow of an embodiment of a method to perform a phrase query.

A second use is illustrated in FIG. 3 which illustrates the high level steps which can be used to perform a phrase query. Steps 300, 302, 304, and 308 are the same as Steps 200, 202, 204, and 208 discussed above with respect to FIG. 2. The processing within the loop differs in that when there is no content index extension 106 available for use with a keyword, it is skipped rather than generating a list using the content index 104. This is because the processing within the loop is acting as a filter and not generating a final answer. When searching for a phrase, it is only necessary to check for the phrase for those files in which all of the keywords occur. This set of files is necessarily a subset of those files in which any combination of the keywords appears. While it is desirable to develop a candidate list for all of the keywords prior to forming the intersection, it is not necessary. Even filtering on a single word can reduce the overhead sufficiently to speed up the search. After the intersection is formed 310 of all of the candidate document lists, the remaining documents are processed 312 using the content index 104 to determine which, if any, contain the exact phrase. That list is the search result which will be made available to the user.

Content Index Extension Structure

Figure 4:
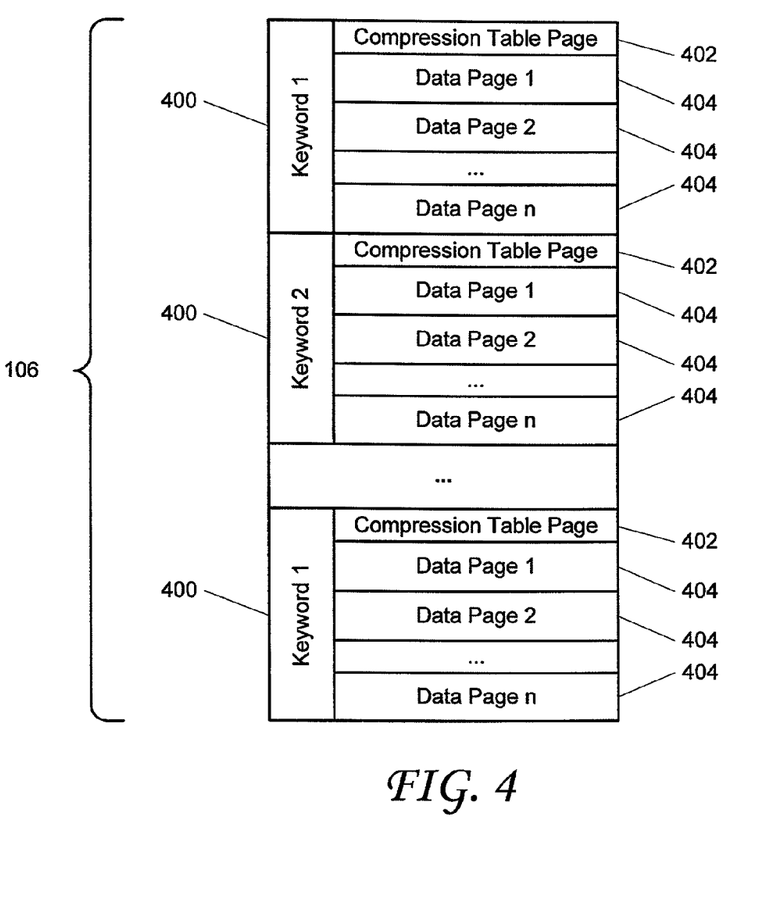
FIG. 4 illustrates an embodiment of a top level structure of a content index extension.

Referring to FIG. 4 the top level structure of the content index extension 106 can be seen. There is a separate segment 400 for each keyword in the index. In one embodiment, each segment starts on a 4096 byte page boundary. The segment can then span as many pages as necessary to hold the data. Within each keyword segment, there are two distinct sets of data. Beginning at the initial page boundary is the Compression Table Page, 402. After this, starting at the next page boundary is a series of one or more Data Pages, 404. Note that page alignment is not required to implement the concepts of the present disclosure but may offer improved performance.

An embodiment of the present disclosure encodes the data for each word separately. This approach enables the use of a separate Encoding Table 504 (See FIG. 5) for each set of keyword data, optimizing the compression within each keyword. In order to decompress the data, decoding information must be available for each keyword. One embodiment stores the Encoding Table 504 with the keyword as part of the Compression Table Page. This is done because the required decoding table can be derived from the Encoding Table 504 and the Encoding Table 504 is smaller, saving storage space. Once the decoding table is generated, the Data Pages 404 can be decompressed and used.

Figure 5:
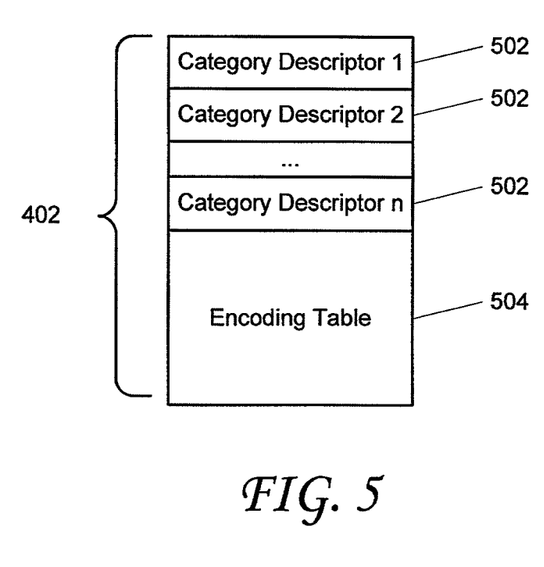
FIG. 5 illustrates an embodiment of a structure for a compression table page.
Figure 7:
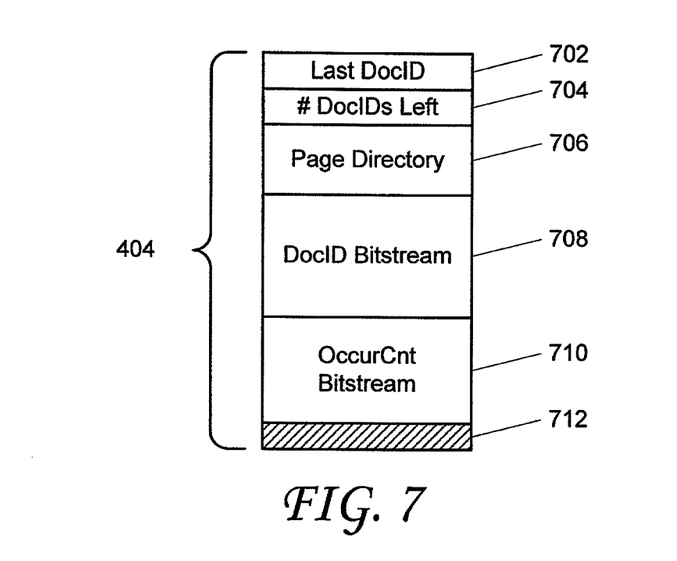
FIG. 7 illustrates an embodiment of a structure for a data page.

FIG. 5 illustrates the structure of the Compression Table Page 402. This structure can best be understood by also referencing the Data Page 404 as illustrated in FIG. 7. At a high level, the data stored for each keyword is a series of references to documents containing the keyword. For each document, two items of information are needed: the document ID (DocID) and an Occurrence Count (OccurCnt) of the number of times the keyword appears in the document. These are stored in separate sections of the data page, the DocID Bitstream 708 and the OccurCnt Bitstream 710. This is due in part to the fact that the occurrence data is not always used and storing it separately means that it does not have to be retrieved with the DocID. Both of these items of information are encoded using the Compression Table Page 402 but in different manners.

OccurCnts are stored in the OccurCnt Bitstream 710 as a series of variable length bit fields. OccurCnt values can vary widely across documents. Because of this, the number of bits required to store the OccurCnt also varies. In one embodiment, a fixed number of different sizes are used to store the OccurCnt. For example, the field may be one of 0, 3, 7, 12, or 20 bits in length. As a result, each document will have an OccurCnt which is stored in a field having one of these finite numbers of lengths. Using this attribute, the documents can then be grouped by the length of their corresponding OccurCnt. In the Compression Table Page 402 these groups are termed Categories and each is represented by a Category Descriptor 502. Because all documents in a particular Category have the same OccurCnt field length, that length only needs to be stored once, as the Bits In Occurrence field 606 in the Category Descriptor 502 rather than with each DocID. This eliminates a significant amount of redundant data from the Content Index Extension 106. A value of 0 for Bits In Occurrence is used to indicate that the OccurCnt value is the same as for the previous DocID. There are no entries in the OccurCnt Bitstream 710 for these entries. The first category contains all DocID Deltas which have this characteristic.

Figure 6:
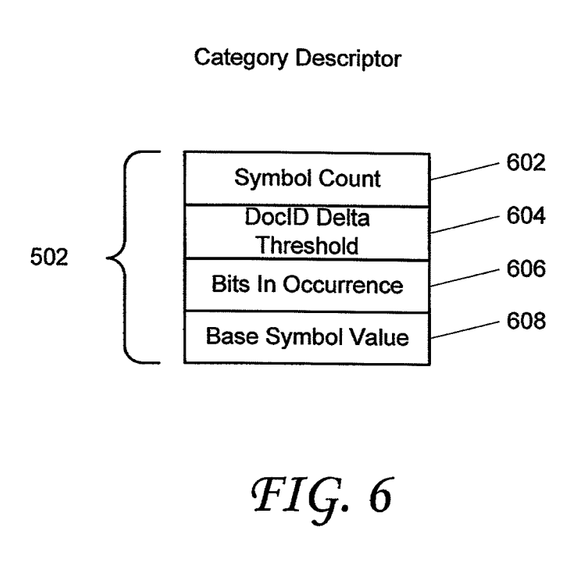
FIG. 6 illustrates an embodiment of a structure for a category descriptor.

FIG. 6 illustrates an embodiment of the category descriptor 502. Symbol Count 602 specifies the number of Symbols in the Category. DocID Delta Threshold 604 specifies the upper limit on DocID Deltas that will be encoded within the category. Bits In Occurrence 606 specifies the number of bits used to store each OccurCnt entry in the OccurCnt Bitstream 710 that corresponds to a Symbol in the Category. The Base Symbol Value 608 ("BSV") defines the value which is added to each DocID Delta value to make it unique to this Category.

Each Symbol used in a Category is the sum of a DocID Delta and the BSV for that Category. The DocID Delta values for each Category range from zero (0) to (DocID Threshold–1). The BSV for the first Category is zero (0) and the BSV for all other Categories is equal to the BSV of the previous category plus the number of symbols in the category. As a result the full set of Symbols represented by all of the Categories is a continuous series from the smallest DocID Delta (0) to the BSV of the last Category plus the largest encoded DocID Delta. Within this series, the set of distinct DocID Deltas repeats in each Category, encoded as a different Symbol by using a different BSV. This approach results in each DocID Delta value appearing in each Category, thus being paired with each available value for Bits In Occurrence.

An embodiment also uses sequential DocID Delta values within each Category. Each Category will contain the same series of values. This allows the DocID Delta value to be calculated from the Symbol and the Category Descriptors. The value of the Symbol serves as an index into the series of DocID deltas represented by the Categories. Which Category it falls into determines the corresponding Bits In Occurrence value and the BSV for the Category. Subtracting the BSV from the Symbol determines the DocID Delta value. Because the ordering defines the Symbol values in each category, it is not necessary to store the symbols. Rather, a Symbol value can be calculated as needed. Other fixed ordering of values within the Categories could also be used to achieve the same result.

Within the Encoding Table 504 the Codes are stored in order corresponding to the entries in the Category Descriptors 502. The number of entries in the Encoding Table 504 is equal to the total number of entries in all of the Categories combined. This correspondence allows a Code to be mapped to a Symbol by using the Code's index in the Encoding Table 504 to index into the Categories. This enables direct calculation of a DocID Delta or the generation of a decoding table from the Category definitions and the Encoding Table 504. Because the decoding can be performed in this manner, discrete Symbol values do not need to be stored in the Encoding Table 504 along with the Codes as would be typical for a Huffman encoding scheme.

One of the concepts of the present disclosure is that the occurrence information within the Content Index Extension 106 does not contain any data about where the keyword occurs in the associated document. The only data is the number of times that the keyword occurs in the document. This occurrence count data supports queries which use a relevance ranking algorithm which differentiates candidate documents based on how often the word appears. This can be done with much less data than would be required for phrase queries which the Content Index Extension 106 of the present disclosure specifically does not support. Another concept of the present disclosure is that the occurrence count data is stored in a separate bitstream from the DocID Delta information. This enables the retrieval of DocID data without retrieving the occurrence data. This further optimizes the index for use where the DocID alone is sufficient. Document length, also used in some relevance ranking algorithms, is also not stored in the Content Index Extension 106, further reducing the amount of stored data.

Referring now to FIG. 7, DocIDs are stored within the DocID Bitstream 708 as a series of symbols generated by the Huffman encoding algorithm. The first step is to convert each DocID into a step size (or delta) from the previous DocID. This DocID Delta is the numerical difference between 2 sequential DocIDs. If the current DocID is known, the delta value enables the next DocID to be calculated. Because the delta is smaller than the DocID, using the delta reduces the amount of data to be stored. It also maps the list of unique DocIDs into a much smaller finite set of numeric values which Huffman compression needs.

Figure 9:
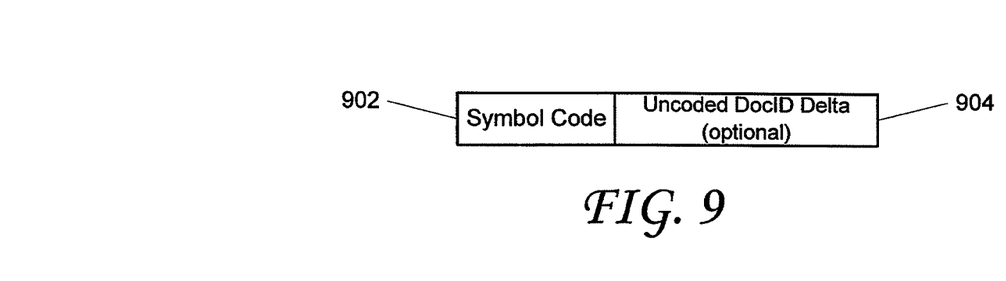
FIG. 9 illustrates an embodiment of a structure for a document ID bitstream entry.

To further restrict the number of possible values, all DocID Deltas greater than a selected DocID Delta Threshold 604 are stored explicitly within the DocID Bitstream 708 rather than as an encoded value. Referring to FIG. 9, encoded DocID entries will only have a Symbol Code 902. Those DocIDs with a delta value greater than the DocID Delta Threshold will be represented by a special symbol value and the delta value will be stored explicitly in the next field as an un-encoded DocID Delta 904. An embodiment uses the value of (BSV+DocID Delta Threshold) as the special symbol. This is a modification to the standard Huffman encoding scheme. It has the advantage of reducing the number of symbols which need to be encoded and incurs minimal size penalty. This is because in a search domain where a large percentage of the documents contain the keyword, the DocID Delta values will typically be distributed across a set of relatively small values. Large delta values will occur rarely. In the Huffman encoding scheme this would result in them being assigned the longest codes. The difference in length between the code which would be used and the delta value itself is relatively small so the cost of storing the delta as an un-encoded value is minimal. In some cases, the combined length of the un-encoded delta and associated special symbol value could actually be smaller than the symbol that would have been assigned in a standard encoding approach. A further embodiment uses two different special symbol values to select two different storage sizes for the explicit DocID Delta value (i.e. two bytes vs. four bytes) to further optimize storage usage.

Figure 8:
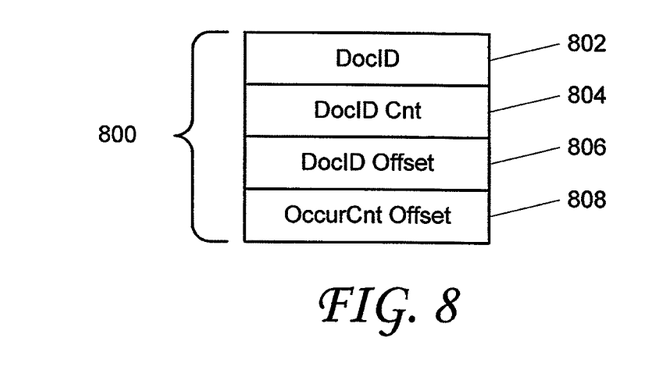
FIG. 8 illustrates an embodiment of a structure for a page directory entry.

Referring again to FIG. 7 it can be seen that each Data Page 404 begins with housekeeping information. In one embodiment this comprises Last DocID 702 which specifies the last document ID stored on this page and Number of DocIDs Left 704 which specifies the number of document IDs remaining, including those on the current page. These are used in navigating through the Data Pages 404. The next section of the Data Page 404 is the Page Directory 706 which is a directory of DocIDs on the current page. For each DocID, there is a Page Directory Entry 800. An embodiment is shown in FIG. 8. The DocID field 802 identifies the specific Document ID to which the entry applies. The DocID Cnt field 804 specifies number of DocIDs in the page prior to the current DocID. The DocID Offset field 806 specifies the offset in bits from the beginning of the DocID Bitstream 708 to the location of the encoded DocID entry within the DocID Bitstream 708. The OccurCnt Offset field 808 specifies the offset in bits from the beginning of the OccurCnt Bitstream 710 to the location of the OccurCnt entry within the OccurCnt Bitstream 710. These values enable direct access to the information for a selected DocID within the Data Page 404 where it is not desirable to traverse the list in order to find the information.

Compression Overview

Generating the compressed data for the content index extension 106 involves two separate high level processes: generating the encoding data; and encoding each entry. Each of these is repeated for each keyword to be listed in the content index extension 106. One approach is described below and illustrated in FIG. 10.

Generate Encoding Data

Figure 10:
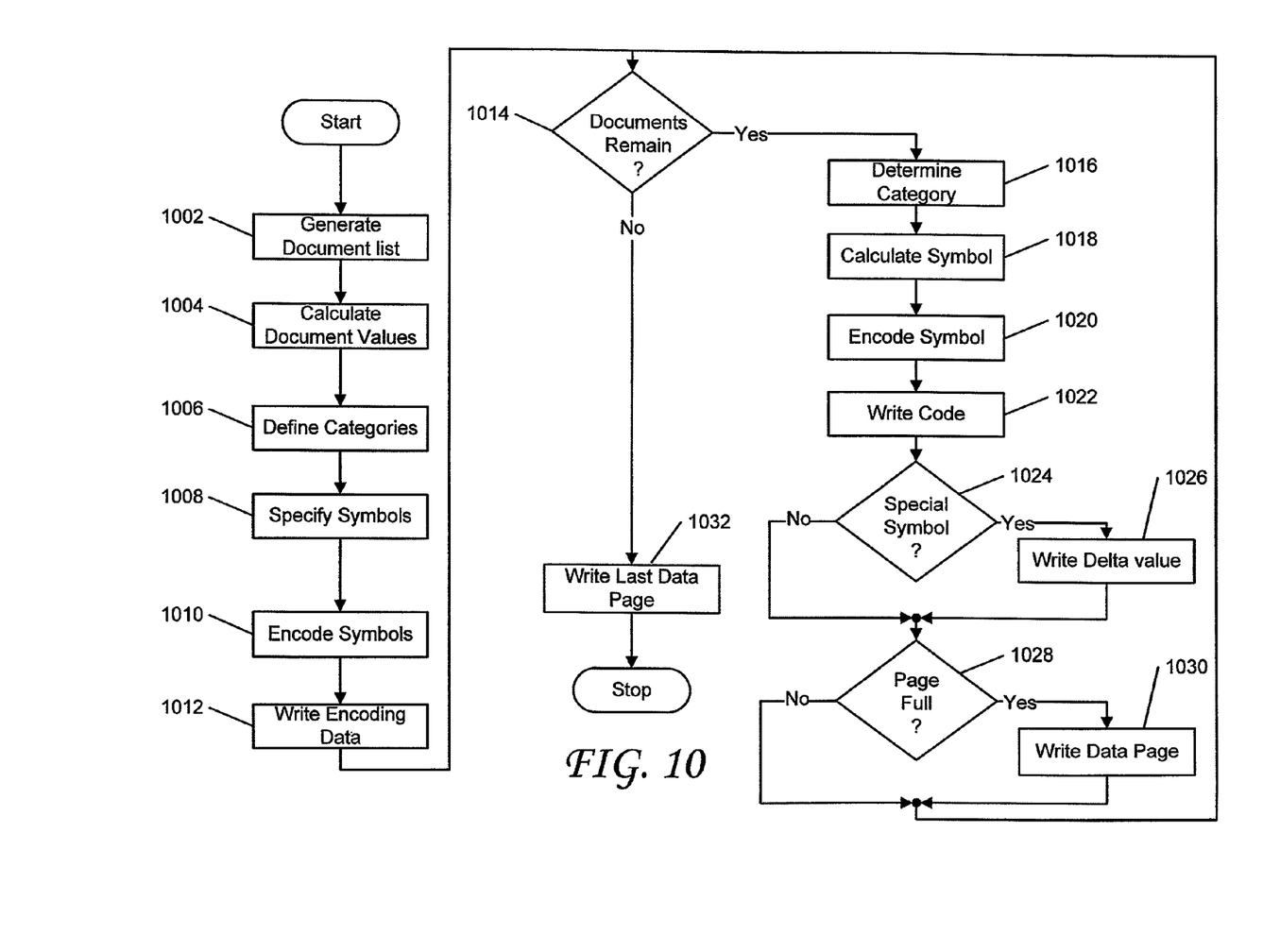
FIG. 10 shows the general flow of the compression process.

The first step in generating the encoding data is to determine the list of documents 1002 in the search domain which contain the keyword. For each document, the DocID Delta and OccurCnt values are determined 1004 along with the Bits In Occurrence value needed to hold the OccurCnt. The full set of these values, across all relevant documents, is stored in a single document list. Using this list, the DocID Delta Threshold value to be used for the Categories is determined based on the DocID Delta values.

With the information from the document list available, the Categories can be defined 1006 and Category Descriptors 502 specified. For each Category, the Symbol Count 602 is defined as one less than the DocID Delta Threshold value. The Symbol Count 602 and DocID Delta Threshold 604 values are common across all Categories. Each Category is assigned a different value for the Bits In Occurrence field 606 selected sequentially from the predefined set of values. Each Category is then assigned a different Base Symbol Vale (BSV) 608 starting at zero (0) and incrementing by Symbol Count 602 for each subsequent Category.

With the Categories defined, the full set of Symbols, spanning all Categories, is specified 1008. Each Symbol is calculated as the BSV for the Category plus the appropriate DocID Delta value. Huffman encoding is then used to generate a distinct Code for each Symbol 1010, utilizing frequency information derived from the document list. The number of times that each unique pair of DocID Delta and Bits In Occurrence occurs in the list is an input to the encoding process with the more frequently used pairs being given shorter Codes. These Codes are combined to create the Encoding Table 504 in the format discussed above. The combined set of Category Descriptors 502 and the Encoding Table 504 can then be written 1012 to the content index extension 106 as the Compression Table Page 402 for the keyword.

Encode Data for Each Document

With the encoding data available, each of the DocID Delta/OccurCnt pairs in the document list can be encoded. For each document in the list 1014, the associated Bits In Occurrence value 606 is used to determine in which Category the data will be encoded 1016. The BSV 608 for the Category is added to the DocID Delta to determine the Symbol 1018. This Symbol is mapped to its associated Code using the Encoding Table 1020, and the Code appended 1022 to the end of the DocID Bitstream 708. If Bits In Occurrence is non-zero, the OccurCnt is appended 1026 to the end of the OccurCnt Bitstream 710 in that number of bits.

For the special case 1024 where the DocID Delta is greater than the DocID Delta Threshold 604, a code corresponding to a special symbol will be used from step 1020 and the DocID Delta will be written 1026 to the DocID Bitstream 708 immediately following the encoded symbol as shown in FIG. 9.

When sufficient data has been accumulated in step 1028 in the DocID Bitstream 708 and OccurCnt Bitstream 710 to fill a Data Page 404 the header information comprising Last DocID 702, Number of DocIDs Left 704, and Page Directory 706 are generated and the complete Data Page written 1030 to the content index extension 106 in the format shown in FIG. 7 and a new Data Page 404 started. This continues until all document information has been encoded and written to the content index extension 106, including writing 1032 the last, possibly partial, data page. Processing then moves to the next keyword to be inserted into the content index extension 106.

Decompression Overview

In a similar manner to compression, decompression involves two major processes: generating the decoding information; and then decoding the information for each document. Typically this is done for individual keywords, those specified in a query, rather than for the entire keyword list at once. One approach is described below and illustrated in FIG. 11.

Generate Decoding Table

Figure 11:
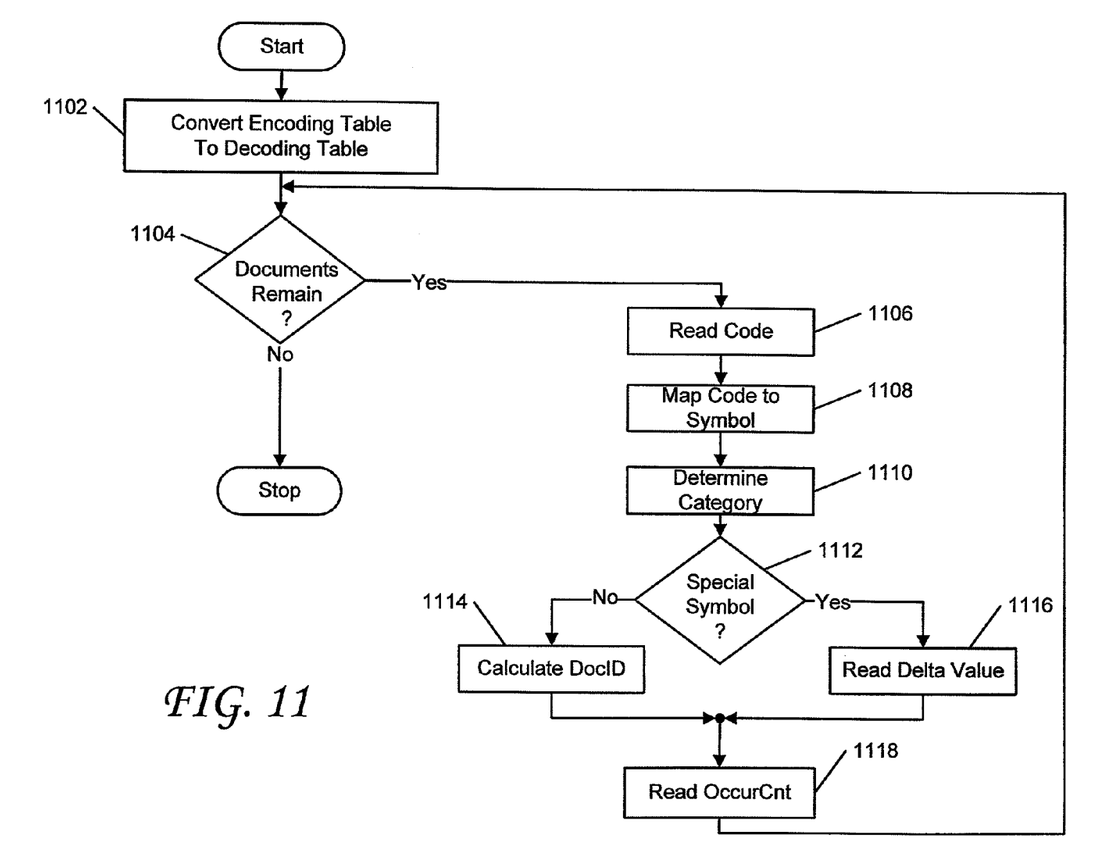
FIG. 11 shows the general flow of the decompression process.

The Encoding Table 504 stored in the Compression Table Page 402 is converted into a decoding table 1102 by reference to the Category Descriptors 502. Because the Codes in the Encoding Table 504 are stored in the same order as the Symbols appear in the Categories, the Code to Symbol mapping can be recreated as a Decoding Table by enumerating the Symbols and matching them to Codes in the sequence that they are stored in the Encoding Table 504.

Decode Data for Each Document

For each document 1104, the Code is read 1106 from the DocID Bitstream 708 and mapped to a Symbol 1108 using the Decoding Table. Comparing the Symbol to the BSVs for the Category Descriptors 502 allows the correct Category to be determined 1110. This determines the Bits In Occurrence 606 value to be used. The symbol is checked 1112 to determine if it is a normal Symbol or a special Symbol. If it is normal, the DocID Delta is calculated 1114. Subtracting the BSV 608 for the Category from the Symbol generates the corresponding DocID Delta value. Adding the DocID Delta to the previously processed DocID generates the current DocID. If the OccurCnt is needed, it can be read 1118 from the OccurCnt Bitstream 710 using the Bits In Occurrence 606 value.

In the special case where the Code read from the DocID Bitstream 708 maps to the special symbol indicating a DocID Delta which exceeds the DocID Delta Threshold 604, the DocID Delta value is read 1116 from the DocID Bitstream 708 immediately following the Code. After step 1118 flow returns to step 1104.

In one embodiment, two modes of access to the bit streams are supported. Sequential access is available by starting at the beginning of each bitstream and maintaining a pointer to the current position in each. The pointer for the DocID Bitstream 708 advances a single bit at a time as each Code is read. Because Huffman encoding uses prefix free codes, the codes vary in length and can be recognized by their bit sequence. This means that a Code could be recognized with any bit read. The pointer for the OccurCnt Bitstream 710 increments by the Bits In Occurrence value corresponding to the Symbol. Direct access is also available via the Page Directory 706. The directory can be searched to find the Page Directory Entry 800 containing the DocID field 802 corresponding to the document being accessed. The DocID Offset 804 supplies an offset into the DocID Bitstream 708 and the OccurCnt Offset 808 supplies an offset into the OccurCnt Bitstream 710. The data for document being accessed can then be retrieved or sequential access can start from that point.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A method of searching a plurality of documents within a search domain, the method comprising:
    determining the plurality of documents within the search domain contain a keyword;
    determining a keyword occurrence count entry corresponding to the number of times the keyword occurs in each document of the plurality of documents;
    providing a compressed document ID delta list having a series of document ID delta entries, one for each of the plurality of documents that contains the keyword;
    providing an occurrence count list having a series of keyword occurrence count entries, one for each of the plurality of documents that contains the keyword;
    associating each keyword occurrence count entry with one of a finite set of categories, wherein each category has an occurrence entry size, wherein each keyword occurrence count entry is of a size substantially equal to the occurrence entry size for the associated category, wherein each category comprises a category base value, and wherein each of the series of document ID delta entries is represented by a symbol that is a sum of a category base value for the associated category and an associated document ID delta entry;
    providing an encoding table for compressing the document ID delta list, the encoding table having a code corresponding to each symbol, wherein a code ordering corresponds to an order of symbols in the finite set of categories, and wherein each symbol is calculated based on the code ordering;
    providing a decoding table based on the encoding table for decompressing the document ID delta list; and
    searching the plurality of documents by using at least one of the encoding table and the decoding information.

2. The method of claim 1, wherein one category has an occurrence entry size that indicates that the keyword occurrence count entry is not stored in the occurrence count list.

3. The method of claim 1, wherein the symbols form a single continuous series across all categories in the finite set of categories.

4. The method of claim 1, further comprising:
    representing the document ID delta list using a single set of document ID delta values that are repeated for each category of the finite set of categories, and wherein a different symbol represents each document ID delta value for each category of the finite set of categories.

5. The method of claim 1, further comprising:
    compressing the document ID delta list using Huffman encoding modified by specifying an upper threshold on a size of document ID delta entries;
    not encoding document ID delta entries that are larger than the upper threshold; and
    explicitly storing document ID delta entries that are larger than the upper threshold in the document ID delta list.

6. The method of claim 5, wherein document ID delta entries that are larger than the upper threshold are associated with a special symbol.

7. The method of claim 1, further comprising:
    wherein the compressed document ID delta list identifies a set of documents based on a plurality of keywords, searching the set of documents by using the compressed document ID delta list to identify a subset of documents containing a given keyword and using the occurrence count list to identify a number of times that the given keyword occurs in each document of the subset of documents.

8. A computing system for performing a method of searching for a keyword occurring in a plurality of documents within a search domain, the method comprising:
    using an index to identify those documents containing the keyword, the index having an encoded document ID delta list, the document ID delta list having a plurality of entries, each entry using a symbol to represent a document ID delta value for each of the plurality of documents in the search domain that contains the keyword;
    associating each of the symbols in the document ID delta list with one of a finite set of categories and with an order within each of the finite set of categories, wherein each category comprises a category base value and each symbol in the document ID delta list is a sum of the category base value and the document ID delta value that the symbol represents;

encoding the document ID delta list using an encoding table, a code ordering in the encoding table corresponding to an order of symbols in the finite set of categories, wherein each symbol corresponds to a code in the encoding table, and wherein each symbol is calculated based on the code ordering; and decoding the document ID delta list using a decoding table that is based on the encoding table.

9. The computing system of claim 8, further comprising:
representing the document ID delta list using a single set of document ID delta values that are repeated for each category of the finite set of categories, and wherein a different symbol represents each document ID delta value for each category of the finite set of categories.

10. The computing system of claim 8, further comprising:
encoding the document ID delta list using Huffman encoding modified by specifying an upper threshold on document ID delta size;

not encoding document ID delta values that are larger than the upper threshold; and explicitly storing document ID delta values that are larger than the upper threshold in the document ID delta list.

11. The computing system of claim 10, wherein document ID delta values that are larger than the upper threshold are associated with a special symbol.

12. The computing system of claim 8, further comprising:
providing an occurrence count list having a series of keyword occurrence count entries, one for each of the plurality of documents that contains the keyword, wherein the occurrence count list comprises a series of contiguous variable length occurrence count entries, wherein a size of each occurrence count entry is selected from a finite set of fixed values.

13. The computing system of claim 12, further comprising:
associating each occurrence count entry with one of the finite set of categories, wherein each category is associated with an occurrence entry size, wherein each occurrence count entry is of a size substantially equal to the occurrence entry size for the associated category.

14. The computing system of claim 13, wherein one category has an occurrence entry size that indicates that an occurrence count entry is not stored in the occurrence count list.

15. A computer storage medium storing instructions for performing a method of searching for a keyword occurring in a plurality of documents within a search domain, the method comprising:

using an index to identify those documents containing the keyword, the index having an encoded document ID delta list, the encoded document ID delta list having a plurality of entries, each entry using a symbol to represent a document ID delta value for each of the plurality of documents in the search domain that contains the keyword;

associating each of the symbols in the encoded document ID delta list with one of a finite set of categories and with an order within each of the finite set of categories, wherein each category comprises a category base value and each symbol in the encoded document ID delta list is a sum of the category base value and the document ID delta value that the symbol represents;

encoding the document ID delta list using an encoding table, a code ordering in the encoding table corresponding to an order of symbols in the finite set of categories, wherein each symbol corresponds to a code in the encoding table, and wherein each symbol is calculated based on the code ordering; and decoding the document ID delta list using a decoding table based on the encoding table.

16. The computer storage medium of claim 15, further comprising:
representing the document ID delta list using a single set of document ID delta values that are repeated for each category of the finite set of categories, and wherein a different symbol represents each document ID delta value for each category of the finite set of categories.

17. The computer storage medium of claim 15, further comprising:
encoding the document ID delta list using Huffman encoding modified by specifying an upper threshold on document ID delta size;

not encoding document ID delta values that are larger than the upper threshold; and explicitly storing document ID delta values that are larger than the upper threshold in the document ID delta list.

18. The computer storage medium of claim 17, wherein document ID delta values that are larger than the upper threshold are associated with a special symbol.

19. The computer storage medium of claim 15, further comprising:
providing an occurrence count list having a series of keyword occurrence count entries, one for each of the plurality of documents that contains the keyword, wherein the occurrence count list comprises a series of contiguous variable length occurrence count entries, wherein a size of each occurrence count entry is selected from a finite set of fixed values.

20. The computer storage medium of claim 19, further comprising:
associating each occurrence count entry with one of the finite set of categories, wherein each category is associated with an occurrence entry size, wherein each occurrence count entry is of a size substantially equal to the occurrence entry size for the associated category.

* * * * *